March 11, 1958 R. L. SARGISSON ET AL 2,826,641

MOUNTINGS FOR TELEPHONE HANDSETS

Filed Jan. 6, 1955 4 Sheets-Sheet 1

INVENTORS.
ROBERT L. SARGISSON
FREDRIC E. WOOD
BY
Wm Walter Cowen
ATTY.

March 11, 1958 R. L. SARGISSON ET AL 2,826,641

MOUNTINGS FOR TELEPHONE HANDSETS

Filed Jan. 6, 1955 4 Sheets-Sheet 2

INVENTORS.
ROBERT L. SARGISSON
FREDRIC E. WOOD

BY Mc Walter Owen

ATTY.

MOUNTINGS FOR TELEPHONE HANDSETS

Filed Jan. 6, 1955 4 Sheets-Sheet 3

*INVENTORS.*
ROBERT L. SARGISSON
FREDRIC E. WOOD
*BY* Wm. Walter Owen
ATTY.

March 11, 1958 R. L. SARGISSON ET AL 2,826,641

MOUNTINGS FOR TELEPHONE HANDSETS

Filed Jan. 6, 1955 4 Sheets-Sheet 4

INVENTORS.
ROBERT L. SARGISSON
FREDRIC E. WOOD

BY Wm. Walter Owen.

ATTY.

United States Patent Office 2,826,641 Patented Mar. 11, 1958

2,826,641

MOUNTINGS FOR TELEPHONE HANDSETS

Robert L. Sargisson, Berwyn, and Fredric E. Wood, McHenry, Ill., assignors to General Telephone Laboratories, Incorporated, a corporation of Delaware Application January 6, 1955, Serial No. 480,171

17 Claims. (Cl. 179—100)

This invention relates to mountings of acoustic devices and more particularly to mountings for handset telephones adapted to be supported on a vertical surface.

One object of the invention is to provide a mounting unit for a handset which will enable easy removal of the handset from a locked position by a user thereof by a resilient and slidable releasing means, while preventing accidental removal therefrom under extraordinary adverse conditions.

Another object of the invention is to provide a locking device for a handset telephone which will maintain the handset in position on the mounting unit under severe conditions such as encountered at battle stations or in gun turrets of fighting units in actual combat.

It is an object of the invention to provide a locking device and mounting unit of the type described which is extremely rugged in construction and which embodies a new and improved arrangement for facilitating slidably replacing or slidably and resiliently removing the handset telephone from the mounting unit to lock or unlock the handset.

One feature of the invention is the novel arrangement of the slide mounting and the locking means therefor.

Further features and objects will be apparent from the following description with reference to the accompanying drawings in which.

Figure 1:
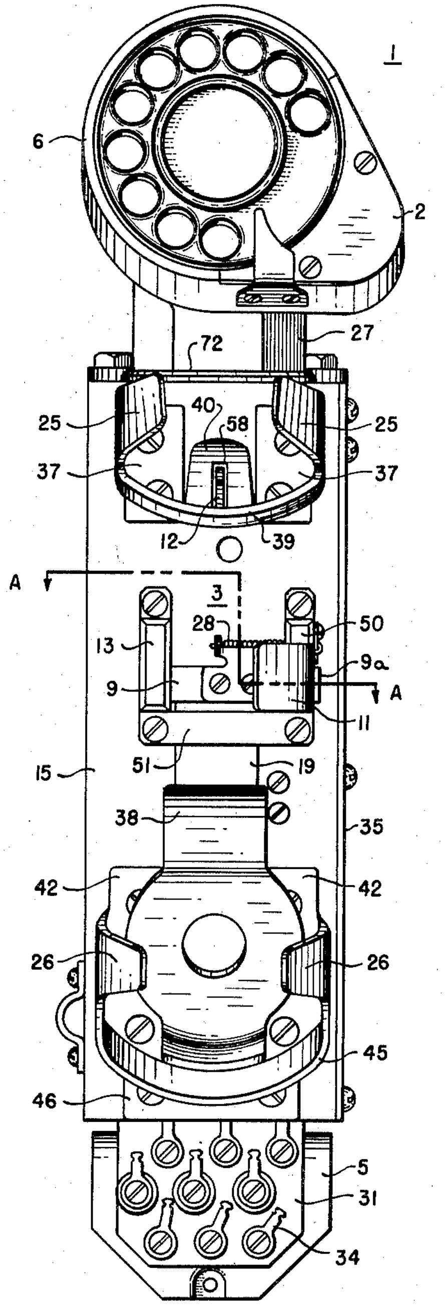
Fig. 1 is a front view of the mounting unit with the telephone handset omitted in order to more clearly illustrate a portion of the interior of the mounting unit and a portion of the locking device in its locked position.

Referring now to the drawings, there is shown a mounting unit or support illustrative of this invention, for supporting a telephone handset 17, which mounting unit comprises a frame 15 having rectangular shaped sides preferably made of brass. The handset used, may be of the type disclosed in the Herbert F. Obergfell Patent No. 2,428,091, issued September 30, 1947, containing a receiver and transmitter at opposite ends of the handle. The frame 15 is enclosed at two sides namely at the right and rear sides and has openings on two sides. The two enclosed sides are moulded as part of the frame 15. The back side and the side shown in Fig. 2 are the two sides having openings for allowing manual accessibility to the equipment mounted within the frame 15. The back side has a back plate 32 (Fig. 2) covering the rear opening and a similar side plate 35 (Fig. 1) covers the side opening to completely enclose all the sides when desired. The plates 32, and 35 respectively, have a plurality of holes cut out corresponding with threaded holes in the frame 15 to fasten the plates 32, and 35 over the openings in the frame by means of screws.

Figure 2:
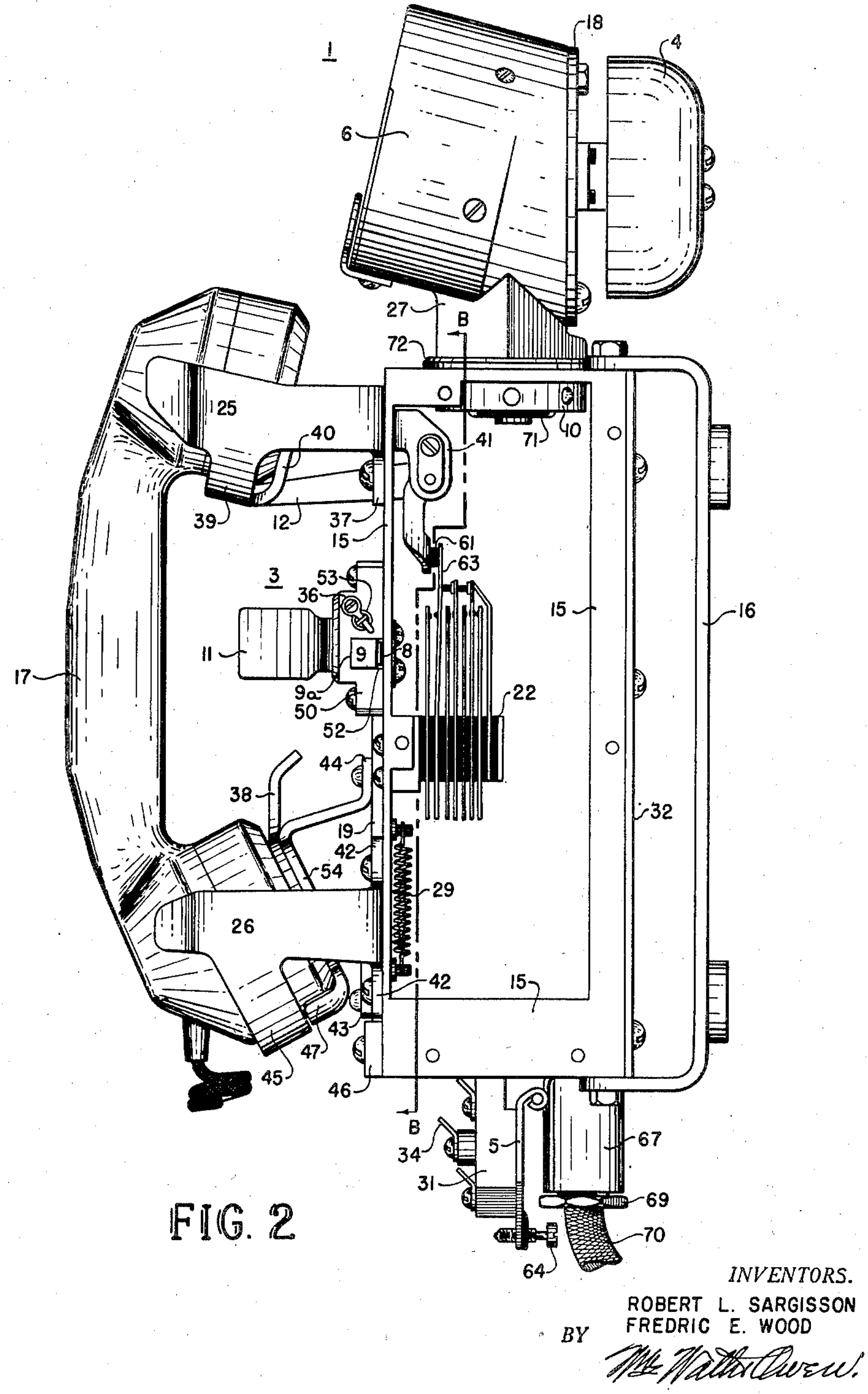
Fig. 2 is a side view of the mounting unit with the handset mounted thereon, with the locking device in its locked position.

Figs. 1 and 2 show a cup shaped receiver receptacle 25 mounted near the top of the front face of the frame 15. The receiver receptacle 25 has feet 37 containing a plurality of holes corresponding with holes in the face of frame 15 for fastening the receiver receptacle 25 to the face of the frame 15 by a screw and nut arrangement. The receiver receptacle 25, is preferably made of brass in a shape to conform with the general contour of the receiver of the handset 17. At each end of the feet 37 the receiver receptacle 25 curves outwardly from the face of the frame 15 and the ends of the receptacle 25 curve in toward each other allowing enough gap between the curved ends for a portion of the handset 17, as shown in Fig. 2. Near the center of the curved portions of the receptacle 25 there is a second curved member 39 curving downward and under receptacle 25 connecting both sides of the receiver receptacle 25 together. The member 39 is for the purpose of supporting the handset 17 in a vertical position as shown in Fig. 2. In the center of the curved member 39 there is a flat angular S-shaped projection 40 projecting upward and inward toward the face of the frame 15 (Fig. 4), for a purpose to be described in the ensuing description.

Near the bottom of the face of the frame 15 there is mounted another cup shaped receptacle 26 for the transmitter of handset 17 and similar to receptacle 25. The transmitter receptacle 26 has feet 42 containing a plurality of mounting holes thereon corresponding with holes in the face of the frame 15 for mounting the transmitter receptacle 26 to the frame 15 by screws and nuts. At each end of the feet 42 the receptacle 26 curves outwardly from the frame 15 and the ends of the receptacle 26 curve in toward each other, allowing enough gap for a portion of the handset 17 to fit in. Near the center of both sides of the outwardly curving portion of the receptacle 26 there is a second curved member 45 curving downward and in toward frame 15 connecting both sides of the receptacle 26. Curved member 45 is for supporting handset 17 in a vertical position as shown in Fig. 2.

Figure 5:
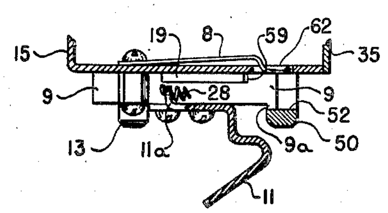
Fig. 5 is a cross-sectional top view taken along line AA of Fig. 1 disclosing the locking device with portions cut away to more specifically show the lock bolt in its locked position.
Figure 9:
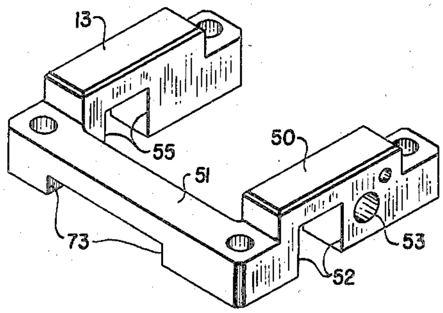
Fig. 9 is a perspective view of the U-shaped mounting bracket of the locking device, omitting portions to more fully show its general contour.
Figure 10:
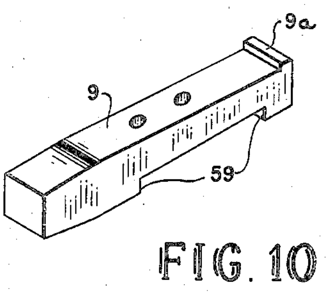
Fig. 10 is a perspective view of the lock bolt used in the locking device, and discloses the general contour thereof.

Mounted on the face of the frame 15 near the center there is shown in Figs. 1 and 2 a locking device 3 for the handset 17. The locking device 3 consists of a "U-shaped" bracket having a vertical lock bar 13 (Fig. 9) adjacent and parallel to a lock bar 50 having a horizontal slide bar stop 51 connecting the bottom ends of the lock bars 13 and 50 together to form substantially a "U shape." The "U-shaped" bracket has four holes cut out at the ends of the lock bar 13, and lock bar 50 (Fig. 9) to correspond with holes cut out on the face of the frame 15, for a screw and nut arrangement, to fasten the locking device to the frame 15 (Fig. 1). The lock bars 13 and 50 have similar parallel openings 52 and 55 (Fig. 9) cut out of their respective rear surfaces. The openings 52 and 55 are cut out to allow a slidable bolt bar 9 to be slidably mounted horizontally therethrough (Fig. 5). Opening 55 of the lock bar 50 is slightly larger than opening 52 to allow a projection 9A of the bolt bar 9 to slide therethrough. The projection 9A (Fig. 10) extends upward from one end of the flat surface of the bolt bar 9 for a purpose to be described in the ensuing description.

Mounted on the front surface and near the center of the bolt bar 9 there is a curved flat thumb plate 11 in the shape shown in Fig. 5. The thumb plate 11 has a flat surface containing two holes corresponding with threaded holes in the bolt bar 9 (Fig. 10) for fastening the thumb plate 11 to the bolt bar 9 by means of screws. From one end of the flat surface of the thumb plate 11 (Fig. 5), it extends outward from the frame 15, inward toward the lock bar 13, and then curves outward and toward the lock bar 50. The thumb plate 11 has an inward projecting extension 11A (Fig. 5), projecting from the flat mounting surface of the thumb plate 11. The projection 11A has a tiny hole cut out for attaching one end of a bolt spring 28. The lock bar 50 has a circular hole 53 therethrough (Figs. 2 and 9) with a diameter slightly larger than the periphery of the bolt spring 28 to allow the bolt spring 28 to extend through the circular hole 53. A threaded hole (Fig. 9) is provided on the outer side of the lock bar 50 near the circular hole 53. A flat washer or spring holder 36 (Fig. 2) having an extended flat projection thereon is mounted to the outer side of the lock bar 50 by a screw, screwed into the threaded hole provided therein. The projection on the spring holder 36 overlaps the circular hole 53 of the lock bar 50 to allow the other end of the bolt spring 28 to be attached thereto (Fig. 2). At this point it is to be understood that manual movement of the thumb plate 11 will cause the storing of tension in bolt spring 28 for causing later movement of the bolt bar 9.

Figure 3:
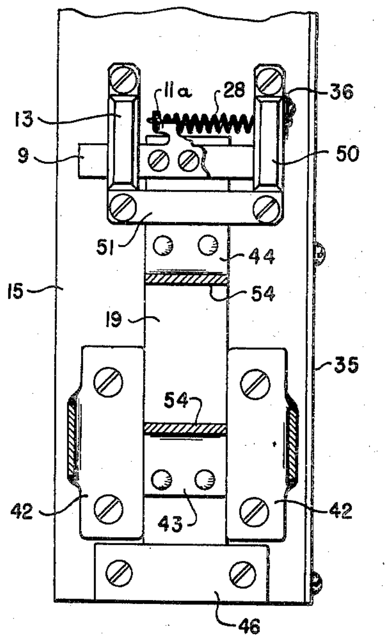
Fig. 3 is a front view of a slidable bar, omitting a portion of the transmitter receptacle and a portion of structure mounted on the slide bar, and showing a cutaway view of the locking device for said bar in its unlocked position.

Referring now to Fig. 3 there is shown a slide bar 19 slidably mounted between feet 42 of transmitter receptacle 26 to guide the slide bar 19 vertically therebetween. Mounted at the bottom of the face of the frame 15 is a horizontal guide bar 46 containing holes corresponding to holes cut out of frame 15 for fastening the guide bar 46 to the frame 15 by a screw and nut arrangement. The guide bar 46 has a vertical opening 49 (Fig. 6) cut out of its rear surface slightly larger than the thickness of slide bar 19, to allow the slide bar 19 at one end, to slide and be guided through the opening 49. The slide bar stop 51 of the "U-shaped" locking device has a similar opening 73 in alignment with the opening 49 to allow the slide bar 19 to slide vertically therebetween. The bolt bar 9 has an off centered vertical opening 59 (Figs. 5 and 9) cut out of its rear surface slightly larger than the thickness of slide bar 19 to allow the slide bar 19 to slide vertically therebetween when the opening 59 is in alignment with the vertical opening 49 and the vertical opening 73 provided in the slide bar stop 51. It is to be understood that should the slide bar 19 be slid upward when the opening 59 is not in alignment with the opening 49 and the opening 73, the slide bar 19 would be stopped by the bottom side of the bolt bar 9 near the opening 59.

Figure 4:
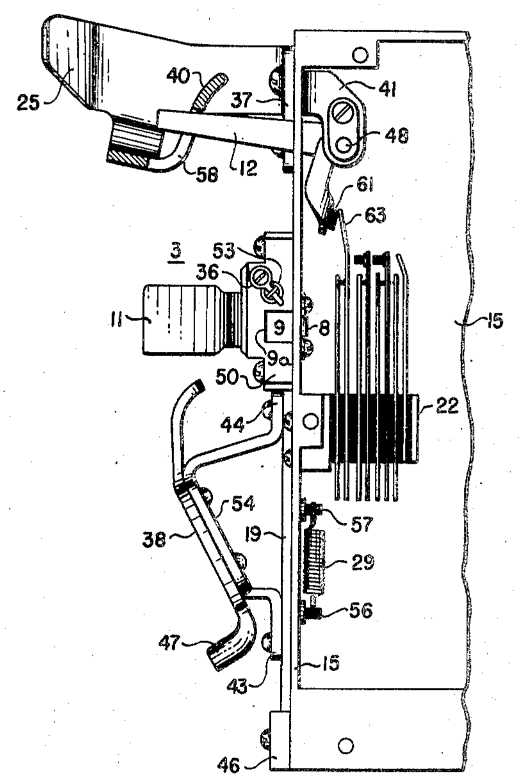
Fig. 4 is a side view with certain parts shown in section and omitting portions of the handset receptacles and other elements to more fully disclose the contour of the handset slide assembly.

Fig. 4 shows a transmitter slide mechanism 54 attached to the slide bar 19. This sliding mechanism contains vertical feet or slide bar stops 43 and 44 vertically spaced apart and riveted to the slide bar 19 near the center of the slide bar 19 longitudinally. From foot 43 the slide mechanism 54 bends away from the frame 15, slants outward and toward the "U-shaped" locking device 3, and then slants upward and inward toward the frame 15 and connects the foot 44. A vertical "S-shaped" member 38 is riveted to the slide mechanism 54. The "S-shaped" member 38 has a flat surface where the "S-shaped" member 38 is riveted to the slanting surface of the slide mechanism 54. At one end of the flat surface of the "S-shaped" member 38 there is a projection 47 extending down and away from the frame 15. At the other end of the flat surface of the "S-shaped" member 38 there is a projection extending almost parallel with the frame 15, and curving inward slightly toward the frame 15. Looking at the "S-shaped" member 38 in Fig. 1 it is shown having an extended portion slightly wider than the width of the slide bar 19 and curving "arc like" on both sides to the other projection 47 which is curved at its end. The member 38 is in a shape to conform with the flat front end of the transmitter of the handset 17 as shown in Fig. 2. The member 38 will be more fully described in the ensuing description.

Foot 44 and foot 43 serve another purpose other than supporting the transmitter slide mechanism 54 and the "S-shaped" member 38. In upward movement of the slide bar 19, the top edge of the foot 43 engages the slide bar stop 51 directly above the hole provided for the slide bar 19, and prevents any further upward movement of the slide bar 19 (Fig. 4). It is to be understood also, that upward movement as before mentioned, is only possible when the vertical hole 59 of the bolt bar 9 is in alignment with the slide bar opening 73 provided in the slide bar stop 51 of the "U-shaped" locking device 3. The bottom edge of the foot 43 when engaging the top side of the guide bar 46 directly above vertical opening 49, prevents any further downward movement of the slide bar 19 (Fig. 2). When in this position, the bottom edge of the slide bar 19 will be flush with the bottom of the guide bar 46. Therefore, the slide bar 19 has limited vertical movement.

Figure 7:
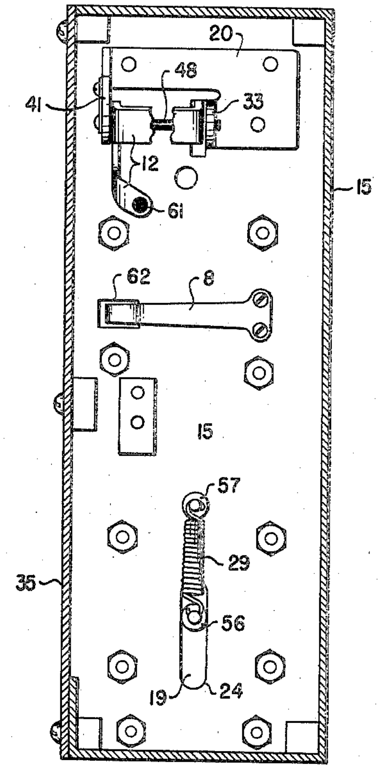
Fig. 7 is a cross-sectional view taken from the right along line BB of Fig. 2 disclosing the equipment mounted on the rear surface of the front of the mounting frame.

The slide bar 19 has a circular stud 56 welded near one end on its rear surface (Figs. 2, 4 and 7). In the center of the circular stud 56 a circular extension projects a short distance away from the slide bar 19. A long narrow vertical aperture 24 is provided in the face of the frame 15 for allowing the stud 56 to extend therethrough.

The diameter of the stud 56 is slightly smaller than the width of the aperture 24 to allow the stud 56 to freely move vertically up and down whenever the slide bar 19 moves vertically (Fig. 7). A second circular stud 57 is provided and welded on the rear surface of the face of the frame 15 a short distance above the aperture 24, adjacent and parallel vertically with the similar circular stud 56. In the center of the circular stud 57 a circular extension (Figs. 2 and 4) projects a short distance away from the face of the frame 15. The center circular extensions provided on the circular studs 56 and 57 contain pin holes through their respective diameters for connecting ends of a slide spring 29 therethrough. It will be pointed out now, that any downward movement of slide bar 19 will cause the storing of tension in the slide spring 29 for later upward movement of bar 19.

Mounted on the rear surface of the face of the frame 15 is a long flat type spring 8 (Fig. 7) extending horizontally and parallel to the "U-shaped" locking device 3. The flat type spring 8 has a wide oval end containing two holes therethrough corresponding with threaded holes in the frame 15 for inserting and screwing two screws therethrough. At the other end of the flat type spring 8, there is a projection (Fig. 5) extending outward a short distance toward the "U-shaped" locking device 3, and then continues horizontally a short distance. An opening 62 (Figs. 5 and 7) is provided through the face of the frame to correspond with the projection of the flat type spring 8, allowing the projection of the spring 8 to engage a portion of the rear surface of lock bar 9. The flat type spring 8 at its projection tends to push against the rear flat surface of the lock bar 9.

In Fig. 5, when the "U-shaped" locking device 3 is in the position shown, the flat type spring 8 pushes the bolt bar 9 outward causing the extended member 9A to be pressed against the top of the hole 52 (Fig. 4). However, should the bolt bar 9 be moved by means of spring 28 until the thumb plate 11 engages the inner side of lock bar 50, the flat type spring 8 will cause the lock bar 9 to move away from frame 15 and cause the inner side of the extended member 9A to move outward and engage its inner side with the outer side of the lock bar 50 (Fig. 2). When in this last-mentioned position, in order to move the bolt bar 9 to the former mentioned position, inward pressure must be applied to the thumb plate 11 to move the bar 9 inward against the tension of spring 8 to cause the top of the extended member 9A to be in alignment with the top of the hole 52. Therefore, in order to unlock the lock bar 9, the inward pressure must be applied to the thumb plate 11, and a horizontal movement toward the lock bar 13 must be manually exercised.

Mounted on the rear surface of the face of the frame 15 is a bracket 20 at the top of the frame 15 (Fig. 7). Bracket 20 at one end extends toward the back of the frame 15 a short distance and downward into an oval shape to form a projection or bearing support 41 (Figs. 2 and 4). A portion of the bracket 20 is cut away in Fig. 7 and another portion is bent outward to form a second bearing support 33 extending toward the back of the frame 15 near the center of the bracket 20. The two bearing supports 41 and 33 are horizontally opposed to each other with their sides being correspondingly parallel to allow a horizontal rod 48 to extend through holes provided through the opposing sides of the bearing supports 41 and 33 and are fastened thereto.

A hook lever 12 has holes on each of the two bent ends by which it is pivotally mounted on the rod 48 which is mounted between the bearing supports 41 and 33 (Fig. 7). One of the bent ends of the hook lever 12 has an extension protruding through a vertical slot in the face of frame 15 and through a parallel vertical slot 58 in the "S-shaped" projection 40 (Figs. 1 and 4). The other bent end of the hook lever 12 has a downwardly curving extension containing a non-metallic bushing 61 at its curved end (Fig. 7).

In Figs. 2 and 4 there is shown a spring assembly 22 mounted on the inner side of frame 15 containing a plurality of vertically mounted springs tensioned toward the face of the frame 15 and a plurality of contacts on the springs. One of the springs, spring 63 extends upward a considerable distance farther than the remaining springs. Spring 63 extends upward and horizontally level with bushing 61 of the hook lever 12, where the spring 63 resiliently re-acts against the bushing 61 and the hook lever 12.

When the hook lever 12 is in the position shown in Fig. 4, the resilient re-action of spring 63 pushes against the bushing 61 causing the hook lever 12 to be pivoted on the rod 48 and causing the outer end of the hook lever 12 to be flush with the top of the vertical slot 58, of the "S-shaped" projection 40. In this position, the remaining springs and contacts of the spring assembly 22 are considered in a closed position, and conversation can be considered taking place over the handset 17. However, should the handset be replaced (Fig. 2) in the receiver receptacle 25, the handset will also engage the outer end of the hook lever 12 and cause the lever 12 to engage the bottom edge of the slot 58, and cause the hook lever 12 to pivot on the rod 48 and the bushing 61 will push the spring 63 toward other springs and contacts of the spring assembly 22 to move the contacts to an open considered position. Therefore, the hook lever 12 controls the positioning of the contacts of the spring assembly 22.

Figure 6:
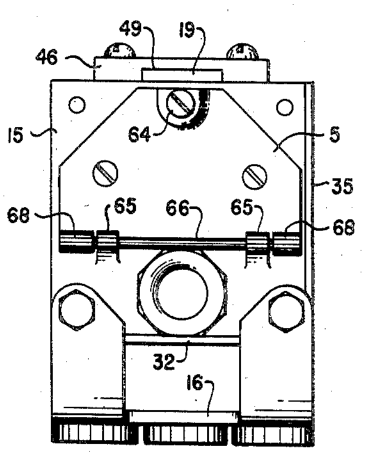
Fig. 6 is a bottom view of the equipment casing disclosing the hinged terminal mounting plate in its closed position and a removable mounting bracket.

Referring now to Fig. 6, there is shown a hinged plate 5, pivotally mounted on the bottom of the frame 15. Moulded on the frame 15 are two rod holders or hinges 65 containing holes therethrough for a rod 66. The hinged plate 5 has two end circular projections 68 encircling the ends of the rod 66 firmly, to allow the hinged plate 5 and the rod 66 to pivot on the hinges 65.

Mounted on the inner surface of the hinged plate 5 (shown in open position in Figs. 1 and 2) is a terminal block 31 with a plurality of terminal contacts 34 mounted thereon. The hinged plate 5 when closed and flush with the bottom of frame 15 overlaps a hole in the frame 15. This hole is provided to accommodate wires extending from inside the frame to the terminal contacts. The hole provided in the bottom of the frame 15 is smaller than the hinged plate 5, but slightly larger than the terminal block 31 and conforming to the contour thereof. Thus, when the hinged plate 5 is in a closed position as in Fig. 6, the edge of the hole provided in the bottom of the frame 15 surrounds the terminal block 31 and the hinged plate 5 overlaps the hole provided in the bottom of the frame 15 to make it weatherproof.

The hinged plate 5 has a threaded hole on one end corresponding with a threaded hole provided in the bottom of the frame 15 for a lock screw 64, to be inserted therethrough, for fastening the hinged plate 5 to the bottom of the frame 15.

In Fig. 2 there is shown a short piece of conduit 67. The conduit 67 is welded at one end over a hole (not shown) on the bottom of the frame 15. At the other end of the conduit 67, there is an octagonal nut 69 having a circular threaded extension (not shown) corresponding with a threaded inner surface of the conduit 67. The octagonal nut 69 by means of its threaded extension is screwed into the threaded inner surface of the conduit 67 to hold a cable 70 in place in a well-known manner. The cable 70 has conductors (not shown) significant of cables, to be dispersed at one end within the frame 15. Some of the conductors are connected to the bottom of the contacts of the contact assembly 22, the dial assembly 1, the terminal block 31, and to other parts of the telephone circuitry within the frame 15.

Shown in Figs. 1 and 2, there is a dial assembly 1 rotatably mounted on top of the frame 15. The dial assembly 1 has an oval shaped casing 6 about the equipment and is preferably made of brass. The type of dial assembly used, is an illuminated number type similar to that disclosed in G. Keller's Patent 1,985,172, issued December 18, 1934.

Shown mounted on the casing 6 at the face of the dial assembly 1 is a plate or lamp cover 2, mounted by means of screws. The lamp cover 2 when removed, allows easy accessibility to the dial equipment and for replacing burned out lamps which are used in conjunction with a Lucite circular rod as shown in said Keller patent to illuminate the numbers of the dial assembly. The purpose of illuminating numbers of a dial assembly for night time conditions or dark locations is old in the art and need not be further described, along with the component parts of the dial assembly.

Referring to Fig. 2, there is shown a ringer 4 to be used on incoming calls as a signal to the subscriber. The ringer 4 is mounted on ringer mounting bracket 18, and the ringer mounting bracket 18 is mounted to the rear flat surface of the casing 6.

Moulded with the dial casing 6 at the bottom, is a vertical dial neck 27. The dial neck 27 is for positioning the dial assembly 1 in a vertical position as shown in Figs. 1 and 2. The dial neck 27 has a threaded extension 71 corresponding with a slightly larger hole on the top of the frame 15 to allow insertion therethrough. A large washer 72 is placed over the hole provided on the top of the frame 15 before the threaded extension 71 of the dial neck 27 is inserted through the hole on the frame 15. A circular capstan nut 10 is shown containing a plurality of circular holes drilled on its outer periphery toward the center of the capstan nut 10. The capstan nut 10 is screwed onto the threaded extension 71 of the dial neck 27 on the inner side of the frame 15. The capstan nut 10 when tightened until its upper surface is flush with the inner surface on the top of the frame 15 insures water tightness by the washer 72 overlapping the hole provided on the top of the frame 15. The circular holes provided on the periphery of the circular capstan nut 10 are for the insertion of pins on a circular rod (not shown) to tighten or loosen the capstan nut 10. Thus, the dial assembly 1 can be rotated into any position and tightly secured by means of the capstan nut 10.

Figure 8:
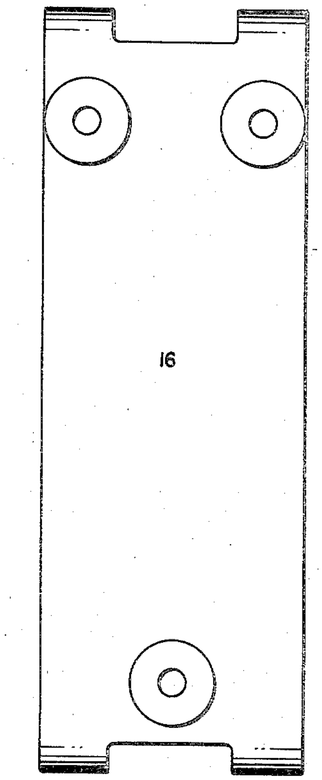
Fig. 8 shows the removable mounting bracket which may be mounted on different sides of the equipment casing.

In Fig. 8 there is shown a flat mounting bracket 16, having three thick washers welded over holes provided through the flat surface of the mounting bracket 16. Two of the washers are welded on one end of the mounting bracket 16, and one washer welded on the other end. On all ends of the mounting bracket 16, there are extensions projecting away from the front surface of the mounting bracket 16. Near the end of these extensions are holes cut through its surface. The span of the inner surfaces of the extensions on the mounting bracket 16 are slightly longer than the length of the frame 15 to allow overlapping thereof. On the top surface, and on the bottom surface of the frame 15 there are threaded holes in each corner. In Fig. 2, mounting bracket 16 is shown mounted on the back side of the frame 15, by means of screws inserted through the holes in the extensions of the mounting bracket 16 and screwed tightly into four of the threaded holes provided on the top and bottom surfaces of the frame 15. It will be recalled however, that all four corners of the top and bottom surfaces of the frame 15 contain threaded holes, and therefore, the mounting bracket 16 could be mounted on any of the two sides or the back side. Referring to Fig. 6 it will be noted that the hinged plate 5 has two corners cut off to allow extensions of the mounting bracket 16 to be mounted flush with the frame 15. Thus, the mounting bracket 16 can be mounted on three sides of the frame 15, and the dial assembly 1 can be rotated to coincide with the position desired. And thus, the mounting bracket 16 can be mounted to the side of a ship or wall in any three positions of the frame 15 as desired.

A full description of the locking device in coordination with the handset will now be disclosed:

*The handset in locked position*

Referring to Fig. 2, the handset 17 is shown in a normal locked position. In this normal position, locking device 3 is in a locked position, whereby the inner surface of the extended member 9A of the bolt bar 9 overlaps the outer surface of the lock bar 50. The vertical hole 59 of the bolt bar 9 is not in alignment with the vertical opening 49 of the guide bar 46, therefore the top of the slide bar 19 engages the bottom side of the bolt bar 9 aside from the vertical hole 59. The flat type spring 8 pushes against the bolt bar 9 to hold the bolt bar 9 in the mentioned position. The bolt spring 28 is normal (Fig. 1) and the spring 29 is tensioned. The bottom of the receiver end of the handset 17 is resting on the hook lever 12 and the curved member 39 of the receiver receptacle 25, and a portion of the flat surface of the receiver is leaning against the bottom of the "S-shaped" projection 40. The receiver receptable 25 constructed to coincide with the general contour of the receiver end of the handset 17, holds the receiver firmly in place. The hook lever 12 which pivots on the rod 48 (Fig. 7) has the bushing 61 pushed against and tensioning the spring 63 to cause the contact assembly 22 to be in an open position.

The transmitter end of the handset 17 rests on the curved projection 45 of the transmitter receptacle 26 and the curved projection 47 of the "S-shaped" member 38. The flat angular surface of the "S-shaped" member 38 presses flush with the flat angular speaking surface of the transmitter to coordinate with the transmitter receptacle 26 which corresponds to the general contour of the transmitter, to hold the transmitter firmly in place. In order to remove the handset, the handset must be moved vertically, and vertical removal of the handset is not possible due to the angular flat surface of the "S-shaped" member 38 pressing against the flat angular surface of the speaking end of the transmitter and holding the transmitter end tightly against transmitter receptacle 26.

*Removal of the handset from locked position*

In order to vertically remove the handset 17 the "U-shaped" locking device must be unlocked in the following manner: manual inward pressure must be applied to the thumb plate 11 causing bolt bar 9 to push the projection of the flat type spring 8 inward. This releases the extended member 9A from the side of the lock bar 50 and aligns the sides of the member 9A with the sides of opening 52. The thumb plate 11 is then pushed horizontally toward the lock bar 13 until the thumb plate 11 engages the lock bar 13, whereby the bolt spring 28 is tensioned (Fig. 3). The bolt bar 9 is now in a position whereby the vertical hole 59 is in alignment with the opening 73 provided through the slide bar stop 51 and vertical opening 49 of the guide bar 46. The tensioned slide spring 29 releases, causing the slide bar 19 to slide upward through the vertical hole 59 of the lock bar 9 and locking the locking device 3 in this position. At the same time the handset 17 with its transmitter resting on projection 47 of the "S-shaped" member 38 moves vertically upward with the slide bar 19. The receiver end of the handset 17 releases the hook lever 12, and the tensioned spring 63 pushes against the bushing 61 to cause the hook lever 12 to pivot on the rod 48 (Fig. 7) causing the outer end of the hook lever 12 to engage the top of the vertical slot 58 of the "S-shaped" projection 40 (Fig. 4), and also to close the contacts of the contact assembly 22 into a closed position. The handset 17 is now loosely resting on the "S-shaped" member 38 and the "S-shaped" projection 40 in a position to allow manual upward removal if desired. With the contacts of the contact assembly 22 in the closed position it is now possible to dial a desired number by means of the dial assembly 1 in a well-known manner and converse with a called party in the usual manner. With the handset resting on the "S-shaped" member 38 and "S-shaped" projection 40 it is not necessary to remove the handset in order to dial since the contact assembly 22 is already in a closed position and dialling is now permissible.

*Replacing the handset into locked position*

After the conversation is terminated over the line of the handset 17, the handset 17 will be replaced to its locked position in the following manner. The flat surface of the speaking end of the transmitter is slid down the angular "S-shaped" member 38 until the transmitter engages the projection 47 and the receiver slides along the flat surface of the "S-shaped" projection 40 until it engages the hook lever 12. Downward manual pressure is then applied to the handset 17 to cause the transmitter engaging the projection 47 to move the slide bar 19 downward. The transmitter slides through the opening provided at the top of the transmitter receptacle 26 and the receiver slides through the opening provided at the top of the receiver receptacle 25. The slide bar 19 moves downward until its bottom edge is flush with the bottom side of the guide bar 46, and the top edge of the slide bar 19 is below the vertical hole 59 of the lock bar 9. The tensioned bolt spring 28 now causes the bolt bar 9 to slide through the holes 52 and 55 toward lock bar 50 until the thumb plate 11 engages the inner side of the lock bar 50, and the extended member 9A is pushed outward by tensioned flat type spring 8 until the inner surface of the extended member 9A engages the outer surface of the lock bar 50 (Fig. 2). The bottom surface of the lock bar 9 prevents the slide bar 19 from moving upward and thus holds the slide bar 19 in its farthest downward position. The hook lever 12 during the downward movement of the handset 17 was engaged by the receiver, and the hook lever 12 pivoted on the rod 48 (Fig. 7), and the bushing 61 pushed the spring 63 outward to cause the contacts of contact assembly 22 to be in an open position and cut off the call over the lines. The handset now rests in a vertical manner as described in "The handset in locked position."

Having fully described the features and aspects of my invention what I consider to be novel is set forth in the appended claims.

What is claimed is:

1. In a telephone substation, a handset having elements such as a receiver and transmitter mounted thereon, a pair of stationary receptacles on said substation each for receiving one of said elements, a slide member having a surface conforming to one of said elements, spring means normally maintaining said slide member away from one of said receptacles, said slide member movable against the tension of said spring means when engaged by said one element to guide the element into its receptacle, and locking means engaging said slide member when the element is moved into its receptacle to cause said slide member to lock said element in its receptacle.

2. A support for a telephone handset comprising a pair of stationary receptacles shaped to conform in shape to the receiver and transmitter ends of the handset, a sliding platform adjacent one of said receptacles, said platform having an upper end slidable through a series of aligned slots located between said receptacles, said platform slidable downward with the handset, when the handset is placed thereon, to lock the handset on the support by holding one of the ends locked in its receptacle, said upper end of the platform moving through said aligned slots and out of one slot, and means for automatically moving said one slot when said upper end passes out therefrom to cause said one slot to move to a position out of alignment with another slot to thereby lock said platform against further movement.

3. A support for a telephone handset comprising a pair of stationary receptacles shaped to conform in shape to the receiver and transmitter ends of the handset, a sliding platform adjacent one of said receptacles, said platform having an upper end slidable through a series of aligned slots located between said receptacles, said platform slidable downward with the handset when the handset is placed thereon to lock the handset on the support by holding one of the ends locked in its receptacle, said upper end of the platform moving through said aligned slots and out of one slot, means for automatically moving said one slot when said upper end passes out therefrom to cause said one slot to move to a position out of alignment with another slot to thereby lock said platform against further movement, and means for locking said one slot in said last position.

4. A support for a telephone handset comprising a pair of stationary receptacles shaped to conform in shape to the receiver and transmitter ends of the handset, a sliding platform adjacent one of said receptacles, said platform having an upper end slidable through a series of aligned slots located between said receptacles, said platform slidable downward with the handset when the handset is placed thereon to lock the handset on the support by holding one of the ends locked in its receptacle, said upper end of the platform moving through said aligned slots and out of one slot, means for automatically moving said one slot when said upper end passes out therefrom to cause said one slot to move to a position out of alignment with another slot to thereby lock said platform against further movement, means for locking said last slot in said last position, said last means unlocked responsive to a manual movement thereof and manually movable to a position to realign said slots, and means for automatically moving said platform when said slots are realigned to thereby remove the handset from said receptacles.

5. A support for a telephone handset comprising a pair of stationary receptacles shaped to conform in shape to the receiver and transmitter ends of the handset, a switch hook operating arm within one receptacle, a sliding platform adjacent the other receptacle, said platform having an upper end slidable through a series of aligned slots located between said receptacles, said platform slidable downward with the handset when the handset is placed thereon to lock the handset on the support by holding one of the ends locked in its receptacle, said upper end of the platform moving through said aligned slots and out of one slot, means for automatically moving said one slot when said upper end passes out therefrom to cause said one slot to move to a position out of alignment with another slot to thereby lock said platform against further movement, said switch hook operating arm moved by one end of the handset when it enters its receptacle.

6. A support for a telephone handset comprising a pair of stationary receptacles shaped to conform in shape to the receiver and transmitter ends of the handset, a switch hook operating arm within one receptacle, a sliding platform adjacent the other receptacle, said platform having an upper end slidable through a series of aligned slots located between said receptacles, said platform slidable downward with the handset when the handset is placed thereon to lock the handset on the support by holding one of the ends locked in its receptacle, said upper end of the platform moving through said aligned slots and out of one slot, means for automatically moving said one slot when said upper end passes out therefrom to cause said one slot to move to a position out of alignment with another slot to thereby lock said platform against further movement, said switch hook operating arm moved by one end of the handset when it enters its receptacle, means for locking said last slot in said last position, said last means unlocked responsive to a manual movement thereof and manually movable to a position to realign said slots, means for automatically moving said platform when said slots are realigned to thereby remove the handset from said receptacles to bring said handset to an unlocked position and to again cause operation of said switch hook operating arm by one end of the handset.

7. In a mounting for a handset telephone, a handset comprising a handle and telephonic instruments at opposite ends of said handle, a mounting frame, a pair of receptacles mounted on said mounting frame, a hook lever pivotally mounted on said mounting frame, a plurality of contact springs mounted on said mounting frame, one of said pair of receptacles having a slot therein, a slot in said frame in alignment with said first slot, said hook lever protruding through said slots, said hook lever engaged by one spring of said plurality of contact springs, said springs normally in closed position, said pair of receptacles for receiving each end of said handset, manually operative means for replacing said handset into said pair of receptacles for engaging and pivoting said hook lever to move said one spring and said plurality of contact springs into an open position.

8. In a mounting for a handset telephone, a handset including a handle and telephonic instruments at opposite ends of said handle, a pair of stationary retaining means, a guided sliding means, a locking means, a pivotally mounted hook lever, a plurality of contact springs, a dialing means, said pair of retaining means for receiving each end of said handset upon downward movement of said handset, said locking means for locking said sliding means to prevent removal or displacement of said handset from said receptacles, one of said retaining means having a slot for said pivotally mounted hook lever, said hook lever engaged by one of said plurality of contact springs, said contact springs in a closed position to allow operation of said dialling means when said handset is removed from said retaining means, said guided sliding means and said handset moved into a locked position when said handset is replaced on the retaining means and said locking means automatically locking said sliding means in said locked position, said handset engaging and pivoting said hook lever to move said plurality of contact springs into an open position and cut off operation of said dialling means when in locked position.

9. In a mounting for a handset telephone, a movable handset retaining means for holding a handset in a retained position, a locking device, a pair of springs cooperating with said locking device to lock said retaining means, manually operative means for moving said locking device in one direction to tension one of said springs and partially unlock said locking device, said manually operative means, when operated, moving said locking device in a different direction to completely unlock said locking device and said retaining means to allow removal of the handset from the retained position.

10. In a mounting for a handset telephone, a handset including a handle and telephonic instruments at opposite ends of said handle, a frame, a pair of stationary retaining means mounted on said frame, a sliding means for engaging one end of said handset and holding it in a resting position, means for holding said sliding means in said resting position, one of said retaining means having an extension for supporting said other end of said handset, a pivotally mounted hook lever, a slot in said extension and a slot in said frame through which said hook lever extends, a plurality of springs having contacts thereon and having a closed position and an open position, said hook lever permitting engagement of said plurality of springs in said closed position, dialling means operable when said contacts are in said closed position without removing said handset from said resting position, said handset and said sliding means manually operative to cause said ends of said handset to engage said retaining means, and means automatically locking said sliding means in a locked position and said other end of said handset in a position to engage and pivot said hook lever to thereby move said plurality of springs and their contacts into said open position to cut off operation of said dialling means.

11. In a mounting for a handset telephone, a handset including a handle and telephonic instruments at opposite ends of said handle, a pair of stationary retainers for receiving each end of said handset respectively, a guided sliding bar containing an extension for engaging and supporting one end of said handset, a U-shaped bar having parallel openings therethrough, a resiliently mounted bar inserted through said parallel openings, said resiliently mounted bar having a slot therethrough for guiding said sliding bar, said sliding bar having a spring mounted thereon, manual replacement of said handset on said extension sliding said sliding bar out of said slot to cause said ends of said handset to engage said retainers, said resiliently mounted bar releasing and sliding further through one opening of said parallel openings and disaligning said slot with said slide bar, said sliding bar being tensioned by said spring mounted thereon and being prevented from insertion into said slot by said slot being disaligned with said sliding bar.

12. In a mounting for a handset telephone, a handset including a handle and telephonic instruments at opposite ends of said handle, a mounting frame, a pair of stationary retainers at each end of said handset, said handset held firmly in said retainers when in one position, a guided sliding bar containing an extension engaging one end of said handset, a U-shaped bar having parallel openings on parallel sides thereof, a bolt having a projection thereon and said bolt projecting through said parallel openings, a flat spring mounted on said frame and tensioned against the said bolt causing said projection to overlap one of said parallel sides, and said slide bar having a spring tensioned to said frame, said bolt having an offset slot, said slide bar engaging said bolt near said offset slot, said bolt having an extended member for manual movement of said bolt, manual pressure on said extended member pushing said bolt against said flat spring to tension said spring and remove said projection from overlapping said one of said parallel sides and to align said bolt with said parallel openings, further manual movement of said extended member sliding said bolt through said parallel openings toward the other parallel side to align said offset opening with said tensioned slide bar, said tensioned spring releasing said slide bar to cause said slide bar to slide through said offset slot and said extension sliding said ends of said handset out of engagement with said pair of retainers to permit removal of said handset.

13. A support for a telephone handset comprising a hook for supporting one end of the handset, a switch hook operating arm associated with said hook, a sliding element engaged by the other end of the handset and movable therewith, said element having an extension passing through a pair of aligned slots and passing out of one of said slots when the handset is engaged with said element and the element is moved downward by downward movement of the handset, means for automatically moving one of the slots out of alignment with the other upon such downward movement of the element to thereby lock said element against movement and hold said one end of the handset in said hook and against said operating arm.

14. A support for a telephone handset comprising a hook for supporting one end of the handset, a switch hook operating arm associated with said hook, a sliding element engaged by the other end of the handset and movable therewith, said element having an extension passing through a pair of aligned slots and passing out of one of said slots when the handset is engaged with said element and the element is moved downward by downward movement of the handset, means for automatically moving one of the slots out of alignment with the other upon such downward movement of the element to thereby lock said element against movement and hold said one end of the handset in said hook and against said operating arm, means for moving said one slot back into alignment with the other slot, and means for automatically moving said element upward when the slots are realigned to thereby remove said one end of the handset from the hook to restore said operating arm.

15. In a mounting for a handset telephone, a handset including a handle and telephonic instruments at opposite ends of said handle, a pair of receptacles, a sliding device having a curved portion and an extension mounted thereon for engaging one end of said handset, one of said receptacles having a curved projection for guiding the other end of said handset thereover, a pivotally mounted hook lever, a plurality of contact springs, said plurality of contact springs having a closed position and an open position and engaging one end of said lever, one end of said handset sliding over said curved portion and said other end of said handset sliding over said curved projection simultaneously to engage said extension and another end of said hook lever, one end of said handset causing said sliding means to move and said one end of said handset engaging one of said receptacles and said other end of said handset engaging and pivoting said hook lever to thereby operate said plurality of contact springs into an open position, and said other end of said handset caused to firmly engage its receptacle by means of a portion of said curved projection, a locking means for automatically locking said sliding device and said sliding device effective when locked to hold said plurality of contacts in said open position.

16. In a telephone substation, a handset comprising a transmitter and receiver, retaining means, locking means, means automatically operative responsive to the engagement of said handset with said retaining means for operating said locking means to prevent disengagement of said handset and said retaining means, contacts for enabling and disabling said transmitter and receiver, means automatically operative responsive to engagement of said handset with said retaining means for operating said contact springs, means for unlocking said locking means, and means automatically operated responsive to unlocking said unlocking means for again operating said contact springs.

17. In a mounting for a telephone handset, a support for a handset, said support movable from a normal to a locking position, a latch for securing said support in said locking position, means for operating said latch to permit movement of said support from said locking position, means for automatically moving said support from said locking position responsive to the operation of said latch to permit such movement, and means for automatically operating said latch to secure said support in said locking position responsive to placing the handset thereon and to moving said support to said locking position.

References Cited in the file of this patent

UNITED STATES PATENTS

| | | |
|---|---|---|
| 2,163,006 | Obergfell | June 20, 1939 |
| 2,439,218 | Obergfell | Apr. 6, 1948 |